United States Patent [19]

Endo et al.

[11] Patent Number: 4,811,773

[45] Date of Patent: * Mar. 14, 1989

[54] HEAVY DUTY PNEUMATIC RADIAL TIRES

[75] Inventors: Kazuyuki Endo, Higashimurayama; Motoaki Taniguchi, Higashiyamato; Shigeki Yamada, Tokyo; Masanobu Takahashi, Iruma; Kenshiro Kato, Kodaira, all of Japan

[73] Assignee: Bridgestone Corporation, Tokyo, Japan

[ * ] Notice: The portion of the term of this patent subsequent to Oct. 20, 2004 has been disclaimed.

[21] Appl. No.: 63,049

[22] Filed: Jun. 17, 1987

[30] Foreign Application Priority Data

Jun. 19, 1986 [JP] Japan ................................. 61-141354

[51] Int. Cl.$^4$ ............................................. B60C 15/06
[52] U.S. Cl. .................................... 152/543; 152/546; 152/554
[58] Field of Search ............... 152/542, 543, 546, 554, 152/560, 548

[56] References Cited

U.S. PATENT DOCUMENTS

| | | | |
|---|---|---|---|
| 3,638,705 | 2/1972 | Devienne et al. | 152/546 X |
| 4,046,183 | 9/1977 | Takahashi et al. | 152/543 X |
| 4,234,029 | 11/1980 | Peter et al. | 152/543 X |
| 4,289,184 | 9/1981 | Motomura et al. | 152/543 X |
| 4,700,764 | 10/1987 | Endo et al. | 152/526 |

*Primary Examiner*—Michael W. Ball
*Assistant Examiner*—Ramon R. Hoch
*Attorney, Agent, or Firm*—Sughrue, Mion, Zinn, Macpeak & Seas

[57] ABSTRACT

A heavy duty pneumatic radial tire for use in airplanes and the like is disclosed, which comprises a toroidal radial carcass, a belt superimposed about a crown region of the carcass, and a bead portion reinforcement comprised of a main chafer made from aromatic polyamide fiber cords, and an auxiliary chafer of at least two outer cord layers and at least two inner cord layers having a triangular truss structure defined by three cord layers among such four cord layers that the cords of the two outer cord layers are crossed with each other with respect to the meridional plane of the tire and the cords of the two inner cord layers are crossed with each other with respect to the meridional plane.

6 Claims, 10 Drawing Sheets

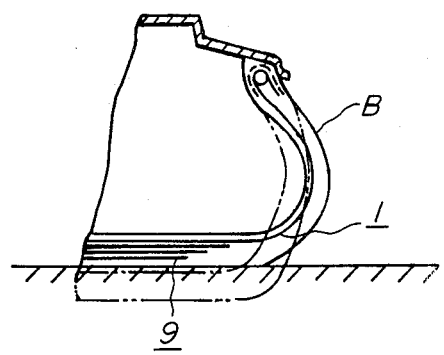
FIG_2
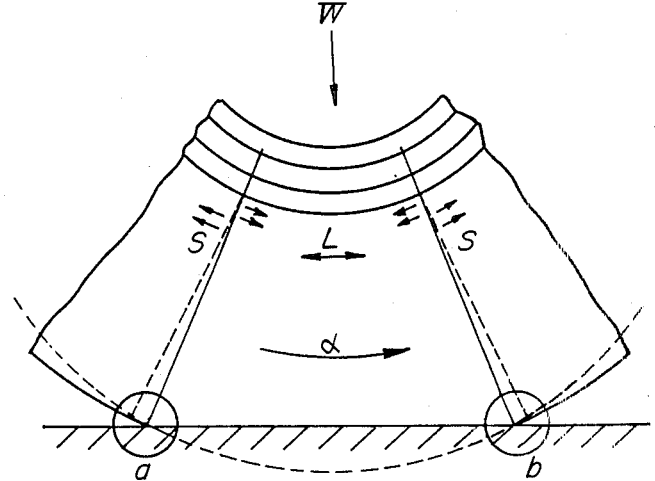
FIG_4

FIG_5
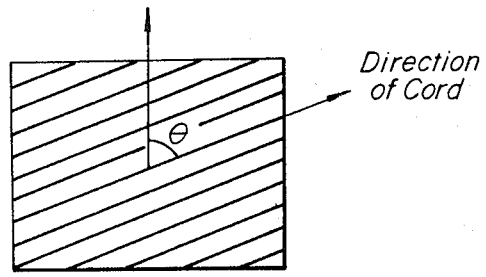
FIG_6a
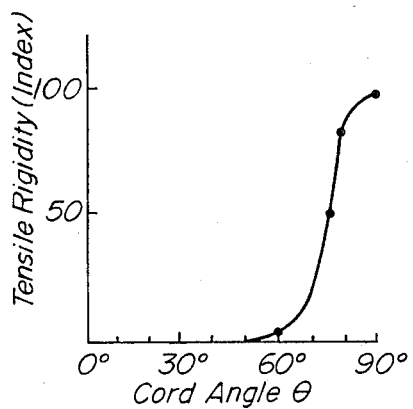
FIG_6b
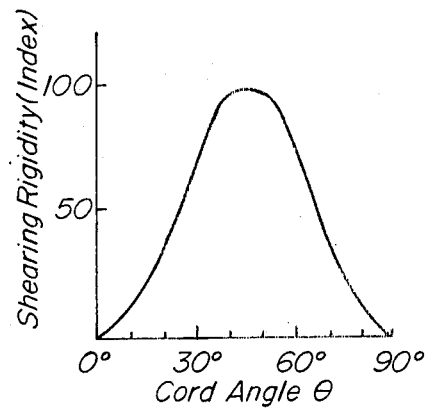

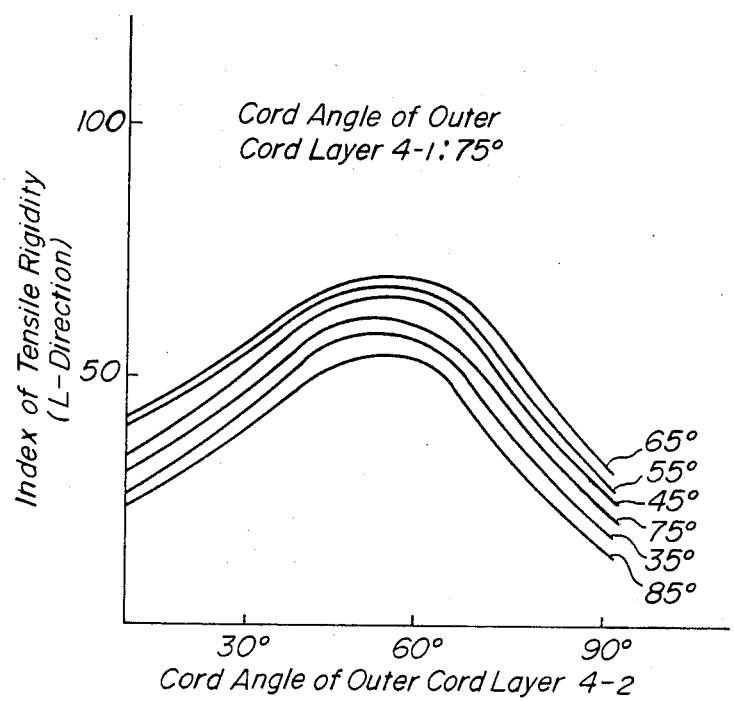
FIG_6c

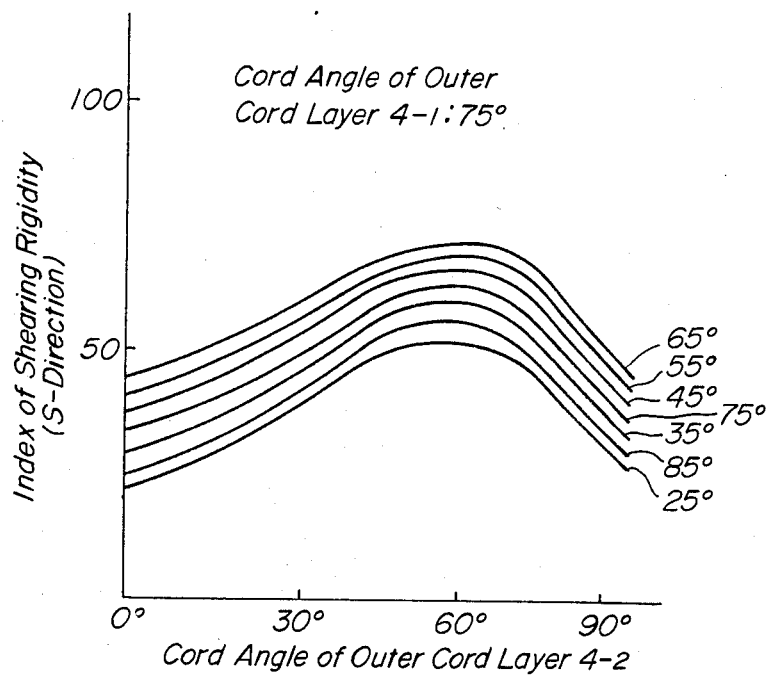

FIG_7a
*PRIOR ART*
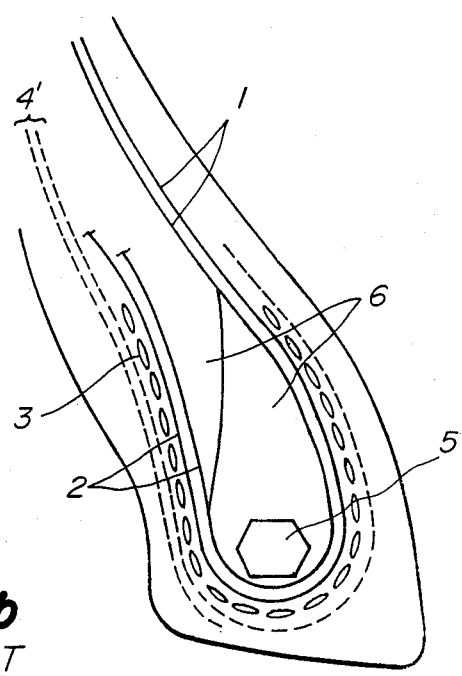
FIG_7b
*PRIOR ART*
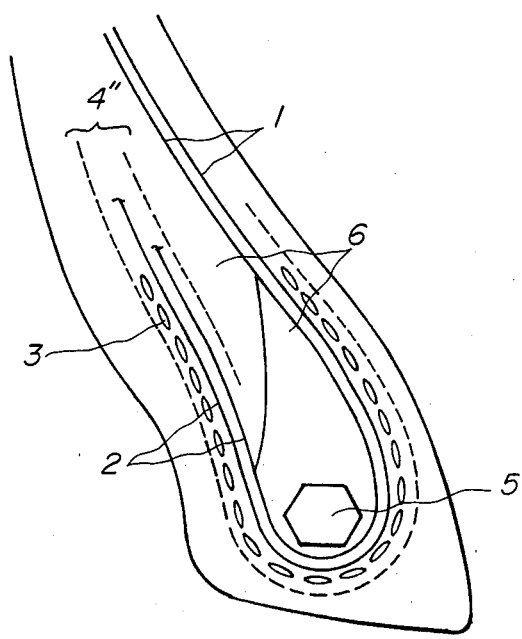

Meridional Plane of Tire

Meridional Plane of Tire

FIG_10

HEAVY DUTY PNEUMATIC RADIAL TIRES

BACKGROUND OF THE INVENTION

1. Field of the Invention

This invention relates to a heavy duty pneumatic radial tire, and more particularly to an improvement of service durability in the bead portion of the heavy duty pneumatic radial tire for use in airplane wheel or the like forcedly subjected to large longitudinal deformation during the running under heavy loading.

In the case of tires for airplanes, the large longitudinal deformation produced in the tire during the running under heavy loading is particularly conspicuous in the taxiing of the airplane, which strongly affects the service durability of the bead portion.

2. Related Art Statement

In this type of the conventional pneumatic radial tire, a toroidal carcass ply is wound around a bead core from the inside of the tire toward the outside thereof to form a turnup portion in a bead portion. The reinforcement of the bead portion is generally performed by embedding a stiffener, a main chafer and two auxiliary chafers in a bead portion rubber. In this case, the stiffener is disposed between the carcass ply and its turnup portion and consists of a base portion placed on the bead core and made of hard rubber stock and a thickness-reducing portion integrally united with the base portion and made of soft rubber stock. Further, the main chafer is arranged outside the carcass so as to extend from a level lower than the upper end of the turnup portion along the turnup area of the carcass ply toward the inside of the tire, while the auxiliary chafer has a modulus of elasticity lower than that of the main chafer and is extended downward from a level higher than the upper end of the turnup portion so as to cover the upper end of the turnup portion and one end of the main chafer. Moreover, the two auxiliary chafers may be arranged outside the main chafer or so as to sandwich the upper end of the turnup portion and one end of the main chafer therebetween, wherein the cords of the auxiliary chafers are crossed with each other at the same inclination angle with respect to the meridional plane of the tire.

Since the longitudinal deflection of the tire is conspicuous in the taxiing of the airplane, a large deformation is forced to the bead portion. In the aforementioned conventional bead portion reinforcement, therefore, fatigue has been experienced that is considerably accumulated in the bead portion due to the repetitive bending stress at ground contact area during the rotation of the tire. Separation failure frequently occurs in the boundary between the carcass turnup end and the rubber surrounding therearound.

Therefore, it has been attempted to reduce strain produced in the bead portion by using three auxiliary chafers and making the cord angles of these auxiliary chafers different to form a so-called triangular truss structure, but such an attempt is still insufficient.

For example, there is a pneumatic radial tire as disclosed in U.S. patent application Ser. No. 826,159, now U.S. Pat. No. 4,700,764, wherein a belt as a reinforcement for tread portion is superimposed about a crown portion of a radial carcass of two cord plies each containing aromatic polyamide fiber cords (3000 d/3) therein and composed of seven belt cord layers each containing the same aromatic polyamide fiber cord layers (3000 d/3). The cords of second and fourth layers viewed from the inside are crossed with each other at an inclination angle of 23° with respect to the equator of the tire and the cords of the remaining layer are arranged substantially in parallel with the equator of the tire. The main chafer is composed of a cord layer containing aromatic polyamide fiber cords (3000 d/3) arranged at an inclination angle of 60° with respect to the cords of the carcass upward to the right. The auxiliary chafer is composed of three cord layers each containing nylon cords (1260 d/2) in such a manner that the cords of a first outer cord layer viewed from the outside of the tire are arranged at an inclination angle of 75° with respect to the meridional plane of the tire upward to the right. The cords of a second outer cord layer are arranged at an inclination angle of 65° downward to the right, and the cords of a third inner cord layer are arranged at an inclination angle of 45° upward to the right. In case of using such a tire for an airplane, the satisfactory service durability is obtained under normal service conditions, but cracks are produced at the end portion of the third inner cord layer under severer conditions such as a load heavier by at least two times than the normal load, a state after the running over long distance and the like.

Further, in the tire having the same structure as mentioned above except that the inclination cord angle of the third inner cord layer is 65°, the satisfactory service durability is obtained under normal service conditions, but cracks are produced at the turnup end of the carcass ply under the severer conditions.

SUMMARY OF THE INVENTION

It is, therefore, an object of the invention to improve the service durability of the bead portion in the radial tire for airplanes by utilizing the triangular truss structure capable of simultaneously solving the aforementioned problems, i.e. The occurrences of cracks at the end portion of the third inner cord layer as an auxiliary chafer and the turnup end of the carcass ply.

According to the invention, there is the provision of a heavy duty pneumatic radial tire comprising a toroidal carcass composed of at least one cord ply containing aromatic polyamide fiber cords arranged in parallel with each other in a direction substantially perpendicular to the equatorial plane of the tire and wound around a bead core from the inside of the tire toward the outside thereof to form a turnup portion, a belt superimposed about a crown region of the carcass and composed of at least three belt cord layers, and a bead portion reinforcement comprised of a main chafer containing aromatic polyamide fiber cords and extending from a level lower than an upper end of the turnup portion along the turnup region of the carcass toward the inside of the tire and an auxiliary chafer composed of plural cord layers, cords of which layers having a modulus of elasticity lower than that of the main chafer, and extending downward from a level higher than the upper end of the turnup portion so as to overlappedly cover the upper end thereof and one end of the main chafer, characterized in that said auxiliary chafer is composed of at least two outer cord layers arranged outside the main chafer, among which at least one outer cord layer being wound along the turnup region of the carcass toward the inside of the tire, and at least two inner cord layers arranged along the inside of the turnup portion, and the cords of first and second outer cord layers among the cord layers constituting the auxiliary chafer viewed from the outside of the tire are crossed with each other with respect to the meridional plane of the tire and the cords of third and fourth inner cord layers are also crossed with each other with respect to the meridional plane of the tire, and said auxiliary chafer has a triangular truss structure using a nodal point between the cord layers as a vertex in three cord layers among the above first to fourth cord layers.

In a preferred embodiment of the invention, at least one of the third and fourth inner cord layers is arranged from the inside of the turnup portion through a space between the carcass and the bead core to the outside of the carcass.

In the other preferred embodiments of the invention, the inner cord layers are terminated at a level lower than one end of the main chafer, and each of the cord layers constituting the auxiliary chafer is made from aliphatic polyamide fiber cords. The cords of the first and second outer cord layers are arranged at inclination angles of 65°~90° and 40°~70° with respect to the meridional plane, respectively. The cords of the third and fourth inner cord layers are arranged at inclination angles of 40°~80° and 30°~70° with respect to the meridional plane, respectively. The starting end of the fourth inner cord layer is lower than that of the third inner cord layer among the inner cord layers.

BRIEF DESCRIPTION OF THE DRAWINGS

FIGS. 2 and 4 are schematic views illustrating the deformation behavior of the tire, respectively;

FIG. 5 is a schematic view showing the definition of cord angle;

FIGS. 6a-6d are graphs showing an influence of cord angle on tensile and shearing rigidities, respectively;

FIGS. 7a and 7b are schematically sectional views of bead portions in the conventional tire, respectively;

DESCRIPTION OF THE PREFERRED EMBODIMENTS

Figure 1:
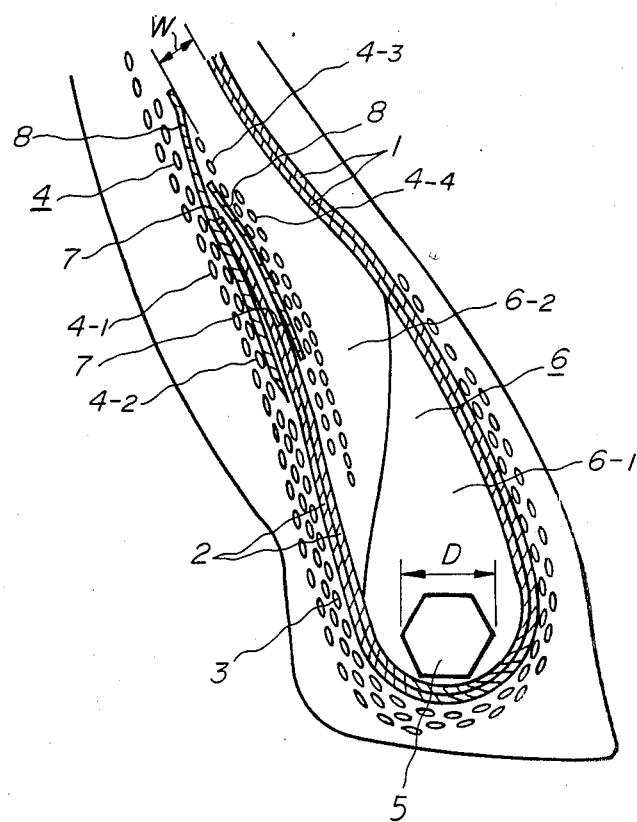
FIG. 1 is a schematically sectional view of an embodiment of the bead portion in the heavy duty pneumatic radial tire according to the invention.

In FIG. 1 is shown a first embodiment of the bead portion of the heavy duty pneumatic radial tire according to the invention as a meridional section thereof, wherein numeral 1 is a carcass composed of two plies in the illustrated embodiment, numeral 2 turnup portions of these carcass plies, numeral 3 a main chafer, numeral 4 an auxiliary chafer composed of four cord layers in the illustrated embodiment, numeral 5 a bead core, numeral 6 a stiffener composed of hard and soft rubber stocks, numeral 7 an end of the turnup portion 2 in the carcass 1, and numeral 8 a cushion rubber.

In the stiffener 6, a sectional area ratio of hard rubber stock or base portion 6-1 to soft rubber stock or thickness-reducing portion 6-2 is optimum at about 1:4. Further, the soft rubber stock has such a thickness that the distance w measured from an inner cord layer (4-3) in the auxiliary chafer 4 to the carcass 1 corresponds to not less than ¼ of the outer diameter D of the bead core 5.

It is a matter of course that a belt 9 composed of at least three cord layers (see FIG. 2) is superimposed about a crown region of the carcass 1 in accordance with known techniques in order to reinforce a tread portion extending from the bead portion through a sidewall.

Figure 3:
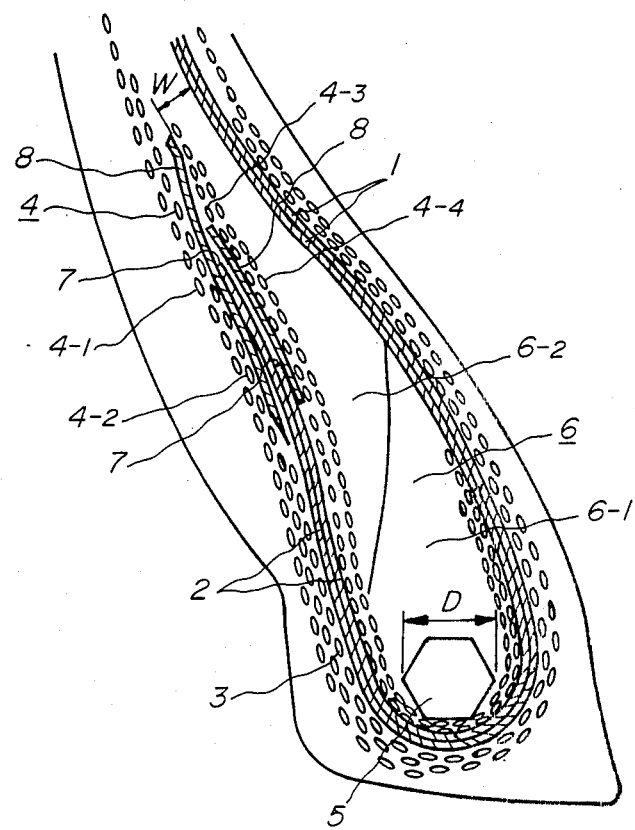
FIG. 3 is a schematically sectional view of another embodiment of the bead portion in the tire according to the invention.

Furthermore, it is preferable that at least one of inner cord layers 4-3 and 4-4 in the auxiliary chafer 4 extends from the inside of the turnup portion 2 to the outside of the carcass 1 around the bead core 5 as shown in FIG. 3 in order to prevent the breaking of the carcass due to the rubbing between the carcass 1 and the bead core 5.

When a pneumatic radial tire of this construction is subjected to the longitudinal deformation just under a loading W as shown in FIG. 2, there is clearly added a bending deformation B that the bead portion falls outwardly from a phantom line to a solid line, which produces a tensile stress as shown by an arrow L in FIG. 4. On the other hand, the deformation of ground contact area of the tread portion ranging from a step-in side a to a kickout side b during the rotation of the tire shown by an arrow $\alpha$ causes a shearing stress S to the bead portion fixed to a rim.

Since the stresses L and S are dependent upon the loading W, it is necessary to enhance resistances to these stresses, i.e. tensile and shearing rigidities in the application of the tire to airplanes or the like.

When the cord angle of the auxiliary chafer 4 exerting on the enhancement of these rigidities is defined by an inclination angle $\theta$ with respect to the meridional plane of the tire as shown in FIG. 5, it has been elucidated from many investigations that the tensile rigidity is advantageously enhanced as the cord angle $\theta$ becomes larger, while the shearing rigidity is enhanced as the cord angle becomes smaller as shown in FIGS. 6a and 6b.

When the simulative calculation on the triangular truss structure in the auxiliary chafer 4 of FIG. 1 is carried out by setting the cord angle $\theta$ of the first outer cord layer 4-1 to 75° and varying the cord angles $\theta$ of the second outer cord layer 4-2 and fourth inner cord layer 4-4, the index of tensile rigidity indicates a peak at the cord angle of the second outer cord layer 4-2 of 40°~70° irrespective of the cord angle of the fourth inner cord layer 4-4 as shown in FIG. 6c, while the index of shearing rigidity can be particularly maintained to a high level at the cord angle of the fourth inner cord layer of 30°~70° while the cord angle of the second outer cord layer 4-2 is held within a range of 40°~70° indicating the above high index of tensile rigidity as shown in FIG. 6d.

Moreover, the similar result is confirmed when the cord angle of the first outer cord layer is varied within a range of 65°~90°.

Figure 8:
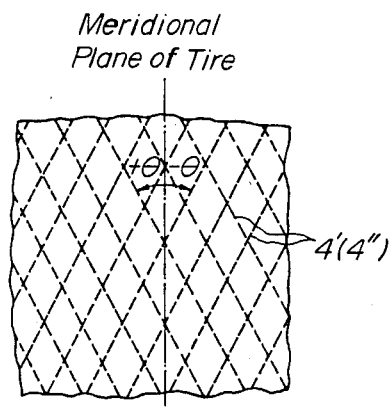
FIG. 8 is a schematic view showing the cord arrangement of the auxiliary chafer in the conventional tire.

In this connection, when the two cord layers as shown in FIG. 7a or 7b are arranged as an auxiliary chafer 4' or 4'' to cross the cords of these layers with each other at the same inclination angle with respect to the meridional plane of the tire in the conventional manner, the network structure defined among cords of the two cord layers forms a lozenge as shown in FIG. 8. This easily causes the pantagraph movement thereof, which does not serve to enhance the tensile rigidity, and also the cord angle itself is frequently unsuitable.

According to the results of the above elucidation, the enhancement of tensile and shearing rigidities can advantageously be realized by constituting the auxiliary chafer 4 with at least three cord layers having cord angles which effectively contribute to surely enhance both the rigidities.

Figure 10:
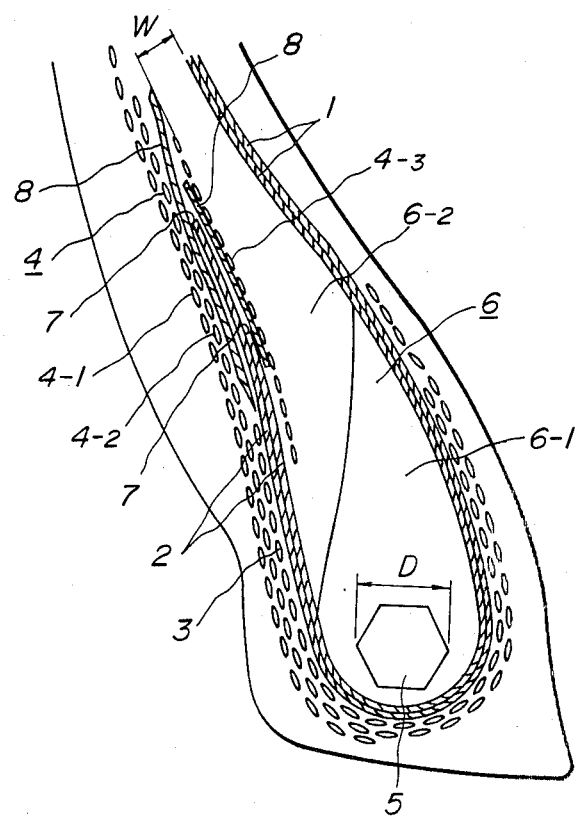
FIG. 10 is a schematically sectional view of the bead portion in the related tire as a comparative example.

That is, as shown in FIG. 10, the auxiliary chafer 4 is composed of three cord layers and has a triangular truss structure that the cords of a cord layer 4-1 or 4-2 among the above three cord layers are arranged at an inclination angle of 65°~90° with respect to the meridional plane of the tire. The cords of a cord layer 4-2 or 4-1 are arranged at an inclination angle of 40°~70° with respect to the same meridional plane to enhance the tensile and shearing rigidities, while the cords of the remaining cord layer 4-4 are arranged at an inclination angle of 30°~70° with respect to the meridional plane in a direction opposite to the cord direction of the cord layer having the cord angle of 40°~70°. Particularly, the turnup portion 2 and the main chafer 3 are interposed between the outer cord layer 4-2 and the inner cord layer 4-4. This serves to control not only the deformation of the ends of the turnup portion and the main chafer but also the growth of the end separation accompanied therewith.

In the auxiliary chafer of triangular truss structure shown in FIG. 10, however, it has been confirmed from various studies that when the tire of FIG. 10 is used under the severer conditions as previously mentioned, cracks are produced in the starting end of the inner cord layer 4-4 when the cord angle of the layer 4-4 is 45° upward to the right or in the end 7 of the turnup portion 2 when the cord angle of the layer 4-4 is 65° upward to the right.

In order to avoid the strain concentration in the starting end of the inner cord layer 4-4, it is effective to lower the height level of this starting end. On the other hand, in order to prevent the occurrence of cracks at the turnup end 7, it is necessary to cover the turnup end 7 with the inner cord layer 4 4. Therefore, the height of the starting end of the inner cord layer 4-4 is made substantially equal to or somewhat higher (about 5 mm) than the height of the turnup end 7. In this case, however, strain concentrates in both ends of the turnup portion 2 and the inner cord layer 4-4, and if cracks occur, the crack growth is accelerated.

According to the invention, the inner cord layer 4-3 is further arranged in such a manner that the starting end thereof is higher than the height of the turnup end 7 as shown in FIG. 1. Thus the strain concentration is prevented in the starting end of the inner cord layer 4-4 and the end 7 of the turnup portion 2.

Figure 9:
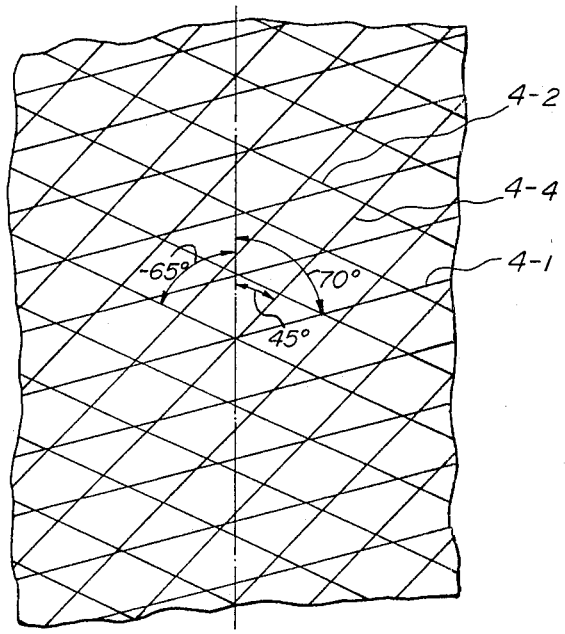
FIG. 9 is a schematic view showing the cord arrangement of the auxiliary chafer in the tire according to the invention.
Figure 11:
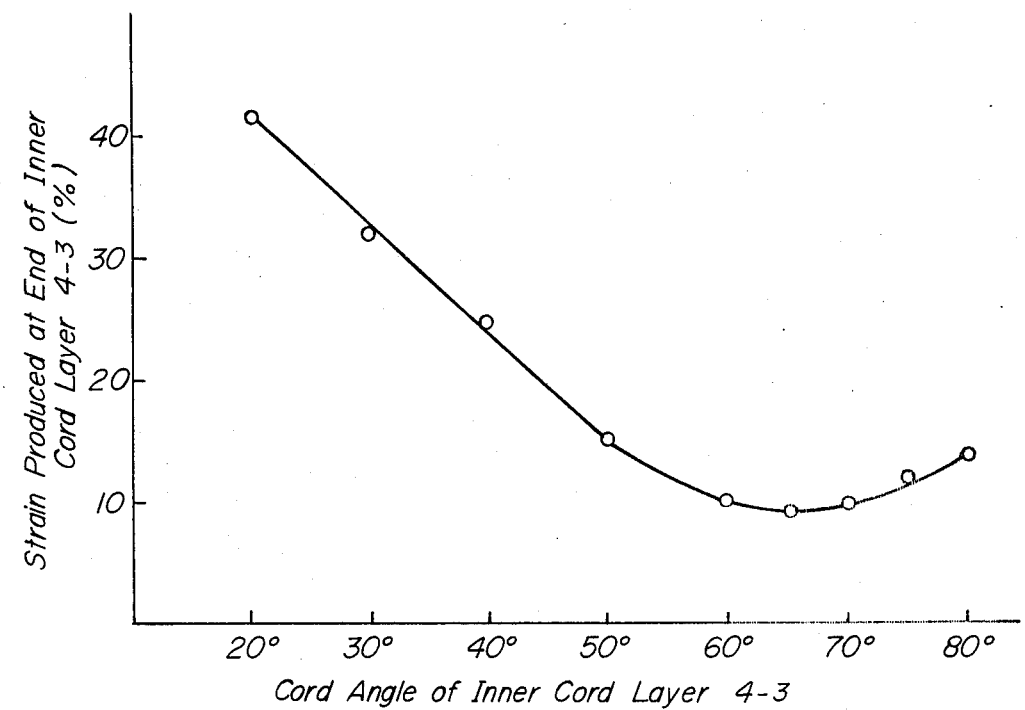
FIG. 11 is a graph showing a dependency of cord angle to strain produced at the end of inner cord layer.

The strain at the starting end of the inner cord layer 4-3 is measured by varying the cord angle of the layer 4-3 while setting the cord angles of the outer cord layers 4-1 and 4-2 and the inner cord layer 4-4 to 70°, 65° and 45°, respectively, as shown in FIG. 9 to obtain results as shown in FIG. 11. As seen from FIG. 11, the cord angle of the inner cord layer 4-3 is not less than 40° in order to reduce strain to not more than 25% for preventing the occurrence of cracks at the end of the layer 4-3. On the other hand, the upper limit of the cord angle of the layer 4-3 should be about 80° from a viewpoint of production restriction. Therefore, the cord angle of the layer 4-3 is within a range of 40°~80°.

Further, the cords of the inner cord layers 4-3 and 4-4 are crossed with each other with respect to the meridional plane of the tire. The cords of the outer cord layer 4-2 and the inner cord layer 4-3 are also crossed with each other, whereby the rigidity in the circumferential direction can be increased to further mitigate the strain at the turnup end 7 of the carcass 1, resulting in the improvement of the service durability.

The following example are given in illustration of the invention and are not intended as limitations thereof.

A tire for use in airplanes having a tire size of H46×18.0 R20 was manufactured, which comprised a tread portion reinforcement comprising a radial carcass of two rubberized plies each containing aromatic polyamide fiber cords (3,000 d/3) therein and a belt superimposed about a crown region of the carcass and composed of seven cord layers each containing aromatic polyamide fiber cords (3,000 d/3) arranged substantially in parallel with the equatorial plane. Further, a tire comprising the bead portion reinforcement comprising the main chafer 3 composed of aromatic polyamide fiber cords (3,000 d/3) arranged at an inclination angle of 60° with respect to the meridional plane, and the auxiliary chafer 4 composed of four cord layers each containing nylon cords (1,260 d/2) and having a structure as shown in the following Table 1.

TABLE 1

| Auxiliarly chafer | Example 1 | Example 2 | Example 3 | Example 4 | Comparative Example 1 | Comparative Example 2 |
|---|---|---|---|---|---|---|
| 4-1 | 75° | 75° | 75° | 75° | 75° | 75° |
| 4-2 | 65° | 65° | 45° | 65° | 65° | 65° |
| 4-3 | 65° | 55° | 75° | 50° | — | — |
| 4-4 | 45° | 45° | 45° | 40° | 45° | 65° |
| Structure | FIG. 1 | FIG. 1 | FIG. 1 | FIG. 1 | FIG. 9 | FIG. 9 |

Note
1: In each of Examples 1–4, the cords of the outer cord layers 4–1 and 4–2 were crossed with each other with respect to the meridional plane of the tire, and the cords of the inner cord layers 4–3 and 4–4 were crossed with each other. Therefore, the cords of the layers 4–1 and 4–3 were inclined in the same direction and the cords of the layer 4–2 and 4–4 were also inclined in the same direction.
2: In each of Comparative Examples 1–2, the cords of the outer cord layers 4–1 and 4–2 were crossed with each other with respect to the meridional plane, and the cords of the outer cord layer 4–1 and the inner cord layer 4—4 were inclined in the same direction.

The stiffener 6 was composed of hard rubber stock or base portion 6-1 having tan δ of 0.264 and soft rubber stock or thickness-reducing portion 6-2 having tan δ of 0.154. Here, tan δ means a loss factor measured at an initial tension of 1% and under a dynamic strain of 2% at 35 Hz.

In each tire of Examples 1–4 and Comparative Examples 1–2, the strain was measured at the end 7 of the turnup portion 2 and the starting end of the inner cord layer (4-3 in each Example, 4-4 in each Comparative Example) when the tire was inflated at a normal internal pressure (200 psi) and subjected to a normal loading (44,200 lbs).

As regards service durability, the number of running cycles of the tire was measured under taxing conditions at a 120% loading defined according to TSO C62-C edition of FAA (Federal Aviation Administration).

These measured results are shown in the following Table 2.

TABLE 2

|  | Example 1 | Example 2 | Example 3 | Example 4 | Comparative Example 1 | Comparative Example 2 |
| --- | --- | --- | --- | --- | --- | --- |
| Strain at turnup end of carcass (%) | 8.3 | 8.7 | 8.6 | 8.2 | 15 | 18 |
| Strain at end of inner cord layer (%) | 7.2 | 8.3 | 8.7 | 8.5 | 19 | 9 |
| Running cycle (number) according to FAA test | 71 | 67 | 65 | 68 | 52 | 48 |

In the embodiment of FIG. 1, the main chafer 3 is wound toward the inside of the carcass 1, but may be terminated at the bead toe. In the auxiliary chafer 4, it is preferable to gradually lower the starting ends of the cord layers from the outer cord layer 4-1 toward the inner cord layer as shown in FIG. 1. Further, it is desirable to change the height levels of the turnup ends 7 of the carcass 1 and the starting end of the main chafer 3 measured from the bead heel.

Moreover, the service durability of bead portion in the conventional bias tire having the same tire size as mentioned above was generally about 50 running cycles.

In the tire of FIG. 1, the service durability can further be improved by using the base portion 6-1 having tan δ of not more than 0.200 and the thickness-reducing portion 6-2 having tan δ of not more than 0.120 as the stiffener 6, and disposing two cushion rubbers 8 each having tan δ of not more than 0.120 between the outer cord layer 4-2 and the inner cord layer 4-3 so as to sandwich the turnup portions 2.

As mentioned above, according to the invention, the service durability of the bead portion is enhanced under such severer conditions that the heavy duty pneumatic radial tire for use in airplane or the like is subjected to a loading heavier by at least 1.2 times than the normal use loading or forced to a considerably long taxiing.

What is claimed is:

1. A heavy duty pneumatic radial tire comprising; a toroidal carcass composed of at least one cord ply containing aromatic polyamide fiber cords arranged in parallel with each other in a direction substantially perpendicular to the equatorial plane of the tire and wound around a bead core from the inside of the tire toward the outside thereof to form a turnup portion, a belt superimposed about a crown region of the carcass and composed of at least three belt cord layers, a bead portion reinforcement comprised of a main chafer containing aromatic polyamide fiber cords and extending from a level lower than an upper end of the turnup portion along the turnup region of the carcass toward the inside of the tire, and an auxiliary chafer composed of plural cord layers containing cords having a modulus of elasticity lower than that of the cords in the main chafer, and extending downward from a level higher than the upper end of the turnup portion so as to overlappedly cover the upper end thereof and one end of the main chafer, said auxiliary chafer having at least first and second outer cord layers arranged outside the main chafer, in which at least one outer cord layer is wound along the turnup region of the carcass toward the inside of the tire, and at least third and fourth inner cord layers arranged along the inside of the turnup portion, wherein cords of first and second outer cord layers among the cord layers constituting the auxiliary chafer viewed from the outside of the tire crossed with each other with respect to the meridional plane of the tire and the cords of third and fourth inner cord layers also crossed with each other with respect to the meridional plane of the tire, and said auxiliary chafer has a triangular truss structure using a nodal point between the cord layers as a vertex in three cord layers among the above first to fourth cord layers.

2. The tire according to claim 1, wherein at least one of said third and fourth inner cord layers is arranged from the inside of the turnup portion through a space between the carcass and the bead core to the outside of the carcass.

3. The tire according to claim 1, wherein said inner cord layers are terminated at a level lower than one end of said main chafer.

4. The tire according to claim 1, wherein said auxiliary chafer is made from aliphatic polyamide cords.

5. The tire according to claim 1, wherein the cords of said first and second outer cord layers are arranged at inclination angles of 65°~90° and 40°~70° with respect to the meridional plane of the tire, respectively, and the cords of said third and fourth inner cord layers are arranged at inclination angles of 40°~80° and 30°~70° with respect to the meridional plane of the tire, respectively.

6. The tire according to claim 1, wherein one end of said fourth inner cord layer is lower than that of said third inner cord layer.

* * * * *